(12) United States Patent
Quinn et al.

(10) Patent No.: US 11,461,149 B1
(45) Date of Patent: *Oct. 4, 2022

(54) CAPACITY MANAGEMENT IN PROVIDER NETWORKS USING DYNAMIC HOST DEVICE INSTANCE MODEL RECONFIGURATIONS

(71) Applicant: Amazon Technologies, Inc., Seattle, WA (US)

(72) Inventors: Michael Phillip Quinn, Seattle, WA (US); Diwakar Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,665

(22) Filed: May 12, 2020

Related U.S. Application Data

(63) Continuation of application No. 15/809,884, filed on Nov. 10, 2017, now Pat. No. 10,684,894.

(51) Int. Cl.
| | |
|---|---|
| *G06F 9/50* | (2006.01) |
| *G06F 9/455* | (2018.01) |
| *H04L 47/72* | (2022.01) |
| *H04L 41/082* | (2022.01) |

(52) U.S. Cl.
CPC ........ *G06F 9/5077* (2013.01); *G06F 9/45558* (2013.01); *H04L 41/082* (2013.01); *H04L 47/72* (2013.01); *G06F 2009/45595* (2013.01)

(58) Field of Classification Search
CPC ............... G06F 9/5077; G06F 9/45558; G06F 2009/45595; H04L 41/082; H04L 47/72

USPC ......................................................... 709/226
See application file for complete search history.

(56) References Cited

U.S. PATENT DOCUMENTS

| | | | |
|---|---|---|---|
| 8,468,535 B1 | 6/2013 | Keagy | |
| 8,661,131 B1* | 2/2014 | Yemini | ............. H04L 29/08234 709/226 |
| 2010/0306382 A1* | 12/2010 | Cardosa | .............. G06F 9/45541 709/226 |

(Continued)

FOREIGN PATENT DOCUMENTS

| | | |
|---|---|---|
| CN | 102640449 A | 8/2012 |
| CN | 104254133 A | 12/2014 |

(Continued)

OTHER PUBLICATIONS

International Search Report and Written Opinion for related International Patent Application No. PCT/US2018/060175, dated Mar. 11, 2019, 18 pages.

(Continued)

*Primary Examiner* — Zi Ye
(74) *Attorney, Agent, or Firm* — Nicholson De Vos Webster & Elliott, LLP

(57) ABSTRACT

Techniques for capacity management in provider networks using dynamic host device instance type reconfigurations are described. A fleet reconfiguration service performs runtime reconfiguration of slots of host electronic devices that are available to execute compute instances, while the electronic devices may execute other compute instances, to dynamically change the type and/or numbers of slots of the electronic devices available for compute instance execution.

20 Claims, 9 Drawing Sheets

(56) References Cited

U.S. PATENT DOCUMENTS

| | | | |
|---|---|---|---|
| 2012/0246638 A1* | 9/2012 | He | G06F 9/45558 |
| | | | 718/1 |
| 2014/0006621 A1 | 1/2014 | Sims | |
| 2015/0106805 A1 | 4/2015 | Melander et al. | |
| 2016/0092258 A1* | 3/2016 | Mehta | G06F 9/5044 |
| | | | 718/1 |
| 2017/0026309 A1* | 1/2017 | Vicaire | G06F 9/5061 |

FOREIGN PATENT DOCUMENTS

| | | |
|---|---|---|
| CN | 105190558 A | 12/2015 |
| WO | 2019/094829 A1 | 5/2019 |

OTHER PUBLICATIONS

Non-Final Office Action for U.S. Appl. No. 15/809,884, dated Sep. 18, 2019, 22 pages.

Notice of Allowance for U.S. Appl. No. 15/809,884, dated Feb. 7, 2020, 9 pages.

Communication pursuant to Article 94(3) EPC, EP App. No. 18808604.5, dated Oct. 16, 2020, 17 pages.

Examination Report No. 1, AU App. No. 2018365063, dated Sep. 30, 2020, 4 pages.

International Preliminary Reporton Patentability, PCT App. No. PCT/US2018/060175, dated May 22, 2020, 15 pages.

Notice of First Office Action, CN App. No. 201880072359.6, dated Nov. 2, 2020, 11 pages (6 pages of English Translation and 5 pages of Original Document).

Anonymous: "Virtualization—Wikipedia", Nov. 7, 2017 (Nov. 7, 2017), pp. 1-7, XP055792657, Retrieved from the Internet: URL:https://en.wikipedia.org/w/index.php? title-Virtualization&oldid-809201155 [retrieved on Apr. 6, 2021].

Coleman Mike: "Containers and VMs Together—Docker Blog", , Apr. 8, 2016 (Apr. 8, 2016), pp. 1-6, XP055792848, Retrieved from the Internet: URL:https://www.docker.com/blog/containers-and-vms-together/ [retrieved on Apr. 6, 2021].

First Examination Report, IN App. No. 202017017158, dated Jun. 24, 2021, 7 pages.

Notice of Allowance, AU App. No. 2018365063, dated Apr. 19, 2021, 3 pages of Original Document Only.

Notice of Allowance, CN App. No. 201880072359.6, dated Jul. 1, 2021, 4 pages (2 pages of English Translation and 2 pages of Original Document).

Notice of Preliminary Rejection, KR App. No. 10-2020-7013074, dated Jul. 14, 2021, 7 pages (4 pages of English Translation and 3 pages of Original Document).

Office Action, JP App. No. 2020-526013, dated May 18, 2021, 4 pages (2 pages of English Translation and 2 pages of Original Document).

Summons to attend oral proceedings pursuant to Rule 115(1) EPC, EP App. No. 18808604.5, dated May 21, 2021, 26 pages.

* cited by examiner

US 11,461,149 B1

CAPACITY MANAGEMENT IN PROVIDER NETWORKS USING DYNAMIC HOST DEVICE INSTANCE MODEL RECONFIGURATIONS

CROSS-REFERENCE TO RELATED APPLICATIONS

This application is a continuation of U.S. application Ser. No. 15/809,884, filed Nov. 10, 2017, which is hereby incorporated by reference.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
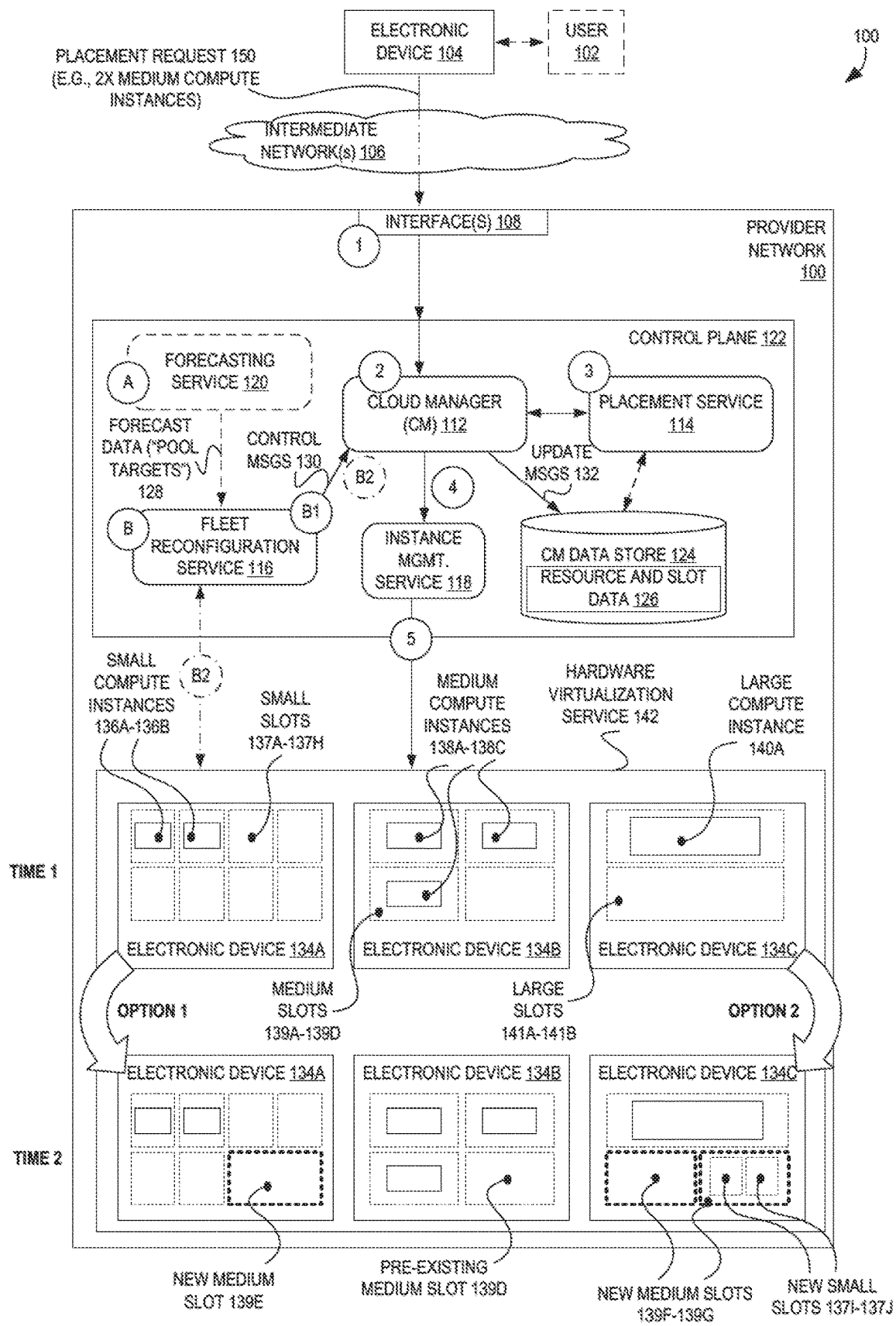
FIG. 1 is a diagram illustrating an environment for capacity management in a provider network using dynamic host device instance type reconfigurations according to some embodiments.

Various embodiments of methods, apparatus, systems, and non-transitory computer-readable storage media for capacity management in provider networks using dynamic host device instance type reconfigurations are described. According to some embodiments, customers of a provider network can launch compute instances of differing compute instance types that can concurrently execute on a same host electronic device. In some embodiments, a fleet reconfiguration service performs a runtime reconfiguration of the host electronic devices, while the electronic devices may be executing other compute instances, to dynamically change the type and/or numbers of slots of the electronic devices available for compute instance execution.

In some embodiments, provider networks implementing heterogenous host electronic devices can provide greater availability of capacity by flexibly adapting to changes in demand for different types of compute instances. Moreover, some embodiments can increase the resource utilization of host electronic devices, reduce the occurrence of failed placement requests due to an unavailability of locations to launch requested compute instances, and/or provide increased fault tolerance for customers by reducing or eliminating a need to place similar types of compute instances at similar locations that could all be affected by a common failure scenario.

In large-scale provider networks, a common approach to providing computing resources in the form of compute instance execution (e.g., executing virtual machine (VM) instances and/or containers) involves allowing customers to launch particular types of compute instances. For example, multiple instance families may be provided that are optimized to accommodate different use cases. As one example, each instance family may provide a varying combination of processing, memory, storage, networking, etc., capacity or capabilities to allow the customers of the provider network the flexibility to choose an appropriate mix of resources for their needs. Further, each instance family may include a number of different instance "sizes" having different amounts or characteristics of the particular resources of the compute instance, allowing customers to scale their resources as needed. Thus, an instance type may be a particular configuration of resources of a compute instance, and thus an instance type can be a combination of an instance family (e.g., a processing-optimized compute instance) and a particular size (e.g., a particular amount of processing, memory, storage, networking, etc.) of the family.

To implement these compute instances, a provider network may provision a large number of electronic devices to serve as hosts upon which the compute instances can be executed, where each of the electronic devices may be configured to provide one or more "slots" for a particular type of compute instance. By configuring the network so that each electronic device hosts only one type of compute instance, the provider network can be constructed simply and the characteristics of the electronic devices can be straightforwardly selected to support known numbers of a type of compute instance.

However, such an approach may lead to a need to maintain "free" pools of capacity for different instance types. Further, when the demand for a particular instance type exceeds the available pool capacity, customers may be unable to immediately launch instances of that type. Instead, a "rebuild" process may be performed to add additional pool capacity, where empty host electronic devices (i.e., that are not currently executing any customer's compute instances) that were configured to support a different instance type could be identified and reconfigured to support the different instance type that is needed. Such a rebuild process may be time consuming, and may not even be able to be immediately performed due to the need to rebuild only empty devices—which might not exist at a given point in time.

Accordingly, embodiments disclosed herein can enable a large-scale provider network to utilize heterogeneous host electronic devices that can concurrently host different instance types. In some embodiments, there may not be a need to find fully empty hosts to meet a demand for a different instance size. Instead, a host electronic device running an instance of one type can be reconfigured to support another instance of a different type, while existing customer instances may continue to run undisturbed. Moreover, in some embodiments, ones of a fleet of host electronic devices can be reconfigured in an "offline" manner, e.g., based on a predicative model or heuristics, to manage the amounts and types of compute instance slots that are available before a need may arise. As a result, the capacity of the fleet of host electronic devices can become fungible and the efficiency of capacity usage can be increased, while decreasing the occurrence of customer launch requests being rejected due to insufficient capacity for a requested type of compute instance. In some embodiments, the utilization of heterogeneous host electronic devices can be completely invisible to customers of the provider network, though beneficially customers would experience greater system availability (e.g., fewer insufficient capacity exceptions) even at times of high demand. Additionally, in some embodiments the host electronic devices of a provider network can be more fully utilized via "packing" compute instances more tightly, which can reduce the number of electronic devices (and thus, the amount of hardware, electricity, management, etc.) required to provide the same amount service to customers. Moreover, by executing multiple types of compute instances on host electronic devices, a large fleet of common compute instances will less likely be placed on a common host device. Thus, any issues with a particular host device will likely not affect an entire tier of a customer's application—as would happen if multiple homogeneous compute instances serving as a tier were placed upon a common device—further providing for increased stability for customers through improved fault tolerance.

FIG. 1 is a diagram illustrating an environment for capacity management in a provider network using dynamic host device instance type reconfigurations according to some embodiments. As described herein, embodiments can be implemented in a provider network 100. A provider network 100 provides its users with the ability to utilize one or more of a variety of types of computing-related resources such as compute resources (e.g., executing compute instances, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service 142 that can execute compute instances, a storage virtualization service that can store data objects, etc. The users (or "customers") of a provider network 100 may utilize one or more user accounts that are associated with a customer account, though these terms may be used somewhat interchangeably depend ending upon the context of use. Users 102 may interact with a provider network 100 using an electronic device 104 across one or more intermediate networks 106 (e.g., the internet) via one or more interface(s) 108, such as through use of application programming interface (API) calls to an API endpoint of the provider network 100, via HyperText Transfer Protocol (HTTP) messages resulting from the use of a console implemented as a website or application, etc. The interface(s) 108 may be part of, or serve as a front-end to, a control plane 122 of the provider network 100 that includes "backend" services supporting and enabling the services that may be more visibly or "directly" offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single "host" electronic device. Thus, a user 102 may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved). Thus, a provider network 100 includes a plurality of electronic devices 134A-134C, which may be of multiple different types having different capabilities.

In FIG. 1, three host electronic devices 134A-134C are illustrated, though in large-scale provider networks 100 there may be hundreds, thousands, tens of thousands, or more electronic devices 134A-134C, which may be located in multiple geographic locations. Additionally, in this example, three different compute instance types—referred to as small, medium, and large—are presented, though in provider networks 100 there may be significantly more or even fewer types of compute instance types utilized.

In this example, at "TIME 1" a first electronic device 134A is shown as initially including eight "small" instance type slots 137A-137H, in which two of these slots are used by two type "small" compute instances 136A-136B. Similarly, a second electronic device 134B is shown as initially including four "medium" instance type slots 139A-139D, in which three of these slots are used by type "medium" compute instances 138A-138C. Finally, a third electronic device 134C is shown as initially including two "large" instance type slots 141A-141B, in which one of these slots is used by a type "large" compute instance 140A. Although in this case each electronic device 134A-134C is shown as hosting homogeneous types of compute instances at the onset, this is not to be interpreted as being a requirement or even a common case and instead is presented accordingly for ease of understanding. However, in some embodiments this scenario may be the case when a homogeneous fleet of electronic devices 134A-134C (i.e., where each only supports one instance type) is migrated, in place, to becoming a heterogeneous fleet having the capability of supporting multiple types of compute instances at a time.

In some embodiments, the provider network 100 can manage its available compute instance capacity by reconfiguring ones of the electronic devices 134A-134C. For example, in some embodiments, a provider network 100 includes a forecasting service 120 that, based on analysis of a previous utilization history of compute instances of the provider network 100, may construct models indicating what types of compute instances may be desired by customers at particular times. For example, a forecasting service 120 may obtain data describing previous compute instance utilization over time—e.g., when requests to launch compute instances were received, what types of compute instances were sought by those requests, when compute instances were launched, what types of compute instances where launched, how long the compute instances were used, etc., and generate a statistical and/or machine learning model for predicting future capacity needs. The forecasting service 120 can, at circle 'A', use a generated model to generate forecast data 128 comprising "pool targets" that indicate how many compute instances of certain types of compute instances are predicted to be needed at a time in the (near) future, and provide this forecast data 128 to a fleet reconfiguration service 116. In some embodiments, the fleet reconfiguration service 116 builds, re-allocates, and manages the multiple different types of "slots" of free pools of capacity.

In some embodiments, to obtain the forecast data 128, the fleet reconfiguration service 116 sends a request (e.g., an HTTP request to an endpoint associated with the forecasting service 120) for the forecast data 128, which is sent back by the forecasting service 120 in a corresponding HTTP response message. However, in other embodiments, the forecasting service 120 may publish (or store) the forecast data 128 to a commonly-accessible storage location that the fleet reconfiguration service 116 can access (e.g., a shared storage or memory location, a message queue), etc.

At circle 'B', the fleet reconfiguration service 116 can obtain current capacity information indicating a current availability (or "excess") of compute instance slots within the provider network 100. For example, the fleet reconfiguration service 116 may query another service of the provider network 100 such as a cloud manager (CM) 112, an information distribution/publishing service, a CM data store 124, etc., or perform lookups in a shared storage/memory location, to obtain capacity information that identifies various available resources (e.g., counts of available slots for each of one or more compute instance types).

With the forecast data 128 and the current capacity information, the fleet reconfiguration service 116 can compare the two to identify any pools (corresponding to compute instance types) where an available amount of capacity (e.g., slots) is less than the predicted amount of capacity for that compute instance type according to the forecast data 128. With any identified compute instance type availability deficiencies, the fleet reconfiguration service 116 can perform reconfigurations of available slots in the provider network 100 to attempt to eliminate any identified deficiencies.

For example, in the example shown in FIG. 1, we stipulate that the forecasting service 120 indicates, in the forecast data 128, that in the future one additional small slot will be needed, two additional medium slots will be needed, and zero additional large slots will be needed. However, in various embodiments the forecast data 128 may be represented in a variety of ways, and thus may indicate a total number of slots (inclusive of existing utilized slots) projected to be needed, an additional number of slots (exclusive of existing utilized slots) projected to be needed, etc.

Additionally, we stipulate that the current availability indicates that six small slots (e.g., small slots 137C-137H) are available, one medium slot (e.g., medium slot 139D) is available, and one large slot (e.g., large slot 141B) is available.

In this case, fleet reconfiguration service 116 can identify one compute instance type pool of slots with a projected deficiency—i.e., the medium compute instance pool of slots is projected to need two additional slots, while only one such slot is available.

In some embodiments, the fleet reconfiguration service 116 can detect this projected deficiency and eliminate it via slot reconfiguration operations. For example, the fleet reconfiguration service 116 can perform an analysis of the existing available slots to identify one or more available slots that can be reconfigured to provide at least one additional "medium" slot.

For example, in some embodiments, the fleet reconfiguration service 116 can determine that certain amounts of other types of slots can be combined to yield a medium slot, and/or that another type of slot can be broken up into a medium slot—and potentially other slots, which may or may not be medium slots.

By way of example, as shown with regard to "OPTION 1" at "TIME 2", the fleet reconfiguration service 116 may determine—according to preconfigured conversion rules, and/or according to a dynamic analysis of the required resources/characteristics of the involved types of compute instances—that if two small slots 137G-137H were eliminated, a medium slot (e.g., new medium slot 139E) could be created. As another example, as shown with regard to "OPTION 2" at "TIME 2", the fleet reconfiguration service 116 may determine that if a single large slot 141B was eliminated, a medium slot (e.g., new medium slot 139F) could be created, optionally along with another new medium slot 139G or perhaps two small slots 137I-137J. Thus, by following (at least) one of these options, the projected deficiency can be eliminated, e.g., by creating a new medium slot 139E together with a pre-existing medium slot 139D, creating (at least) a new medium slot 139F together with a pre-existing medium slot 139D, etc., at least two medium slots are made available.

Note that, although in some embodiments only one of these two options may be implemented, in other embodiments both options could be followed, perhaps to meet other available slot pool goals—e.g., always keeping a threshold number of a particular amount of available compute instance type slots, always keeping a maximum number of a particular type of compute instance slots, etc.

To perform a reconfiguration, the fleet reconfiguration service 116 may perform a variety of different types of operations based upon the particular implementation of the provider network 100. For example, in some embodiments the fleet reconfiguration service 116 sends a variety of control messages 130 (at circle 'B1', such as to the CM 112) to cause a set of resource and slot data 126 to be updated to reflect the changed available slot characteristics (e.g., via update messages 132). The fleet reconfiguration service 116 may also directly or indirectly (e.g., such as via issuing commands to the CM 112) perform a variety of operations with the selected one or more electronic devices 134A-134C to be reconfigured (at circle 'B2'), such as verifying the utilization or non-utilization of slots of the one or more electronic devices 134A-134C. Further details describing exemplary operations according to some embodiments will be presented later herein with regard to FIG. 2.

With the benefit of dynamically managed—and reconfigured—compute instance slots in the provider network 100, additional need for additional compute instances can be provided quicker and easier. For example, continuing the example in which two additional "medium" type compute instance slots were projected to be needed, we assume that the fleet reconfiguration service 116 followed at least one of "option 1" or "option 2" as described above to result in at least two "available" or free medium compute instance type slots existing.

Thereafter, a placement request 150 (from electronic device 104) seeking two medium compute instances to be launched may be received at circle '1' at an interface 108 of the provider network 100. The request—or a similar message identifying what is sought by the request—can be passed on to the control plane 122. As an example, a capacity management service may inspect the request, identify that two medium compute instances are sought, and perform a lookup in the pool of available medium compute instances to determine whether at least two such medium slots are available. If not, the request 150 could be denied (e.g., a corresponding response could be sent back to the electronic device 104 indicating an insufficient capacity). However, in this case due to the a priori reconfiguration on the part of the fleet reconfiguration service 116, there are at least two free medium compute instance type slots available, and thus the request 150 can be serviced and passed to the CM 112.

At circle '2', the CM 112 can begin placement operations for the placement, and may issue a placement request to a placement service 114, which at circle '3' can identify placement locations for the two medium compute instances. For example, the placement service 114 have visibility into current capacity of the system (e.g., direct or indirect access into resource and slot data 126), to identify available medium slots and apply certain placement rules and/or business logic to select ones of the available medium slots upon which to place the desired medium compute instances.

For each selected placement location (or slot), the placement service 114 may return to the CM 112 a placement data including one or more resource vectors, where each identifies a specific set of resources in a host electronic device upon which a compute instance is to be placed. As an example, consider an electronic device with two non-uniform memory access (NUMA) nodes (e.g., "slices" of processing capability with memory having a same rate of connectivity)—"N1" and "N2"—and 2 terabytes (TB) of hard disk. From this configuration, the following are a few simplified examples of resource vectors: <N1, 0-1 TB>, <N2, 1-2 TB>, and <N1, N2, 0-2 TB>. As another example, a resource vector could include NUMA node identifiers, processing capabilities, and memory; as another example a resource vector could include (e.g., in addition to processing and/or memory) a number of firewall rules associated with the compute instance and/or the electronic device, an amount of available bandwidth, an amount of available networking "burst", an identifier of available graphics processing units (GPU) and/or accelerator devices (e.g., a fraction of whole, or an address range), an amount of persistent storage, a bandwidth for writing/reading to disk, etc. A resource vector can be represented in a variety of different types of formats, e.g., as JavaScript Object Notation (JSON), Extensible Markup Language (XML), etc.

This resource vector (which in some embodiments may include slot-related information) can be returned to the CM 112, which at circle '4' can send the resource vector (and perhaps supporting information) as part of a collection of properties for the launch of the medium compute instances to a instance management service 118.

The instance management service 118 can identify the resource vector information (and in some embodiments, the slot information therein), and cause the compute instances to be launched at circle '5' at the desired slots.

For example, in some embodiments the instance management service 118 may cause an offload card (which may include one or more processors, a local memory, physical network interfaces, etc.) that is a part of (e.g., coupled with) a host electronic device to launch the required compute instances at the particular desired slot location. The offload card may implement a virtualization manager that can manage, for example, virtual machine compute instances that execute on a host electronic device, independent of a hypervisor or in combination with a hypervisor that executes using the traditional CPU(s) of the electronic device. For example, in some embodiments, the virtualization manager implemented by the offload card can instantiate and/or terminate virtual machines, thus eliminating the need for the hypervisor to perform these tasks, which can improve the performance of the virtual machines themselves due to not having to compete for resources with the hypervisor. Alternatively, in some embodiments the instance management service 118 may alternatively interact with a hypervisor (e.g., via a VM management server) to cause the compute instances to be launched.

Figure 2:
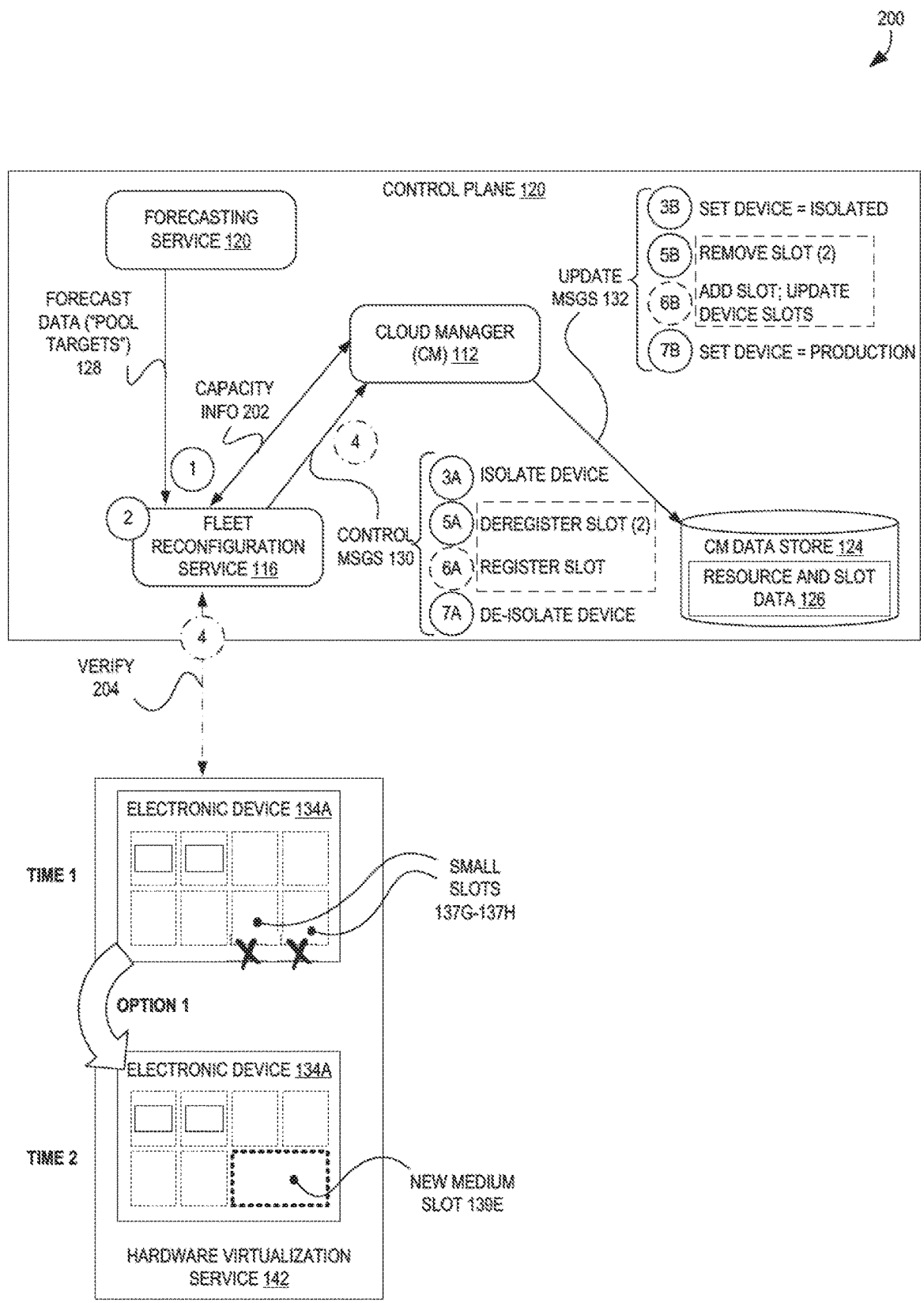
FIG. 2 is a diagram illustrating exemplary operations and messaging involving a fleet reconfiguration service and a cloud manager for capacity management in a provider network using dynamic host device instance type reconfiguration according to some embodiments.

For further detail regarding the reconfiguration of the host electronic devices on the part of the fleet reconfiguration service 116, we turn to FIG. 2, which is a diagram illustrating exemplary operations and messaging involving the fleet reconfiguration service and the CM for capacity management in a provider network using dynamic host device instance type reconfiguration according to some embodiments.

Similar to FIG. 1, forecast data 128 and capacity information 202 (here shown as being obtained from the CM 112, though other sources of the capacity information 202 may be utilized) is obtained by the fleet reconfiguration service 116 at circle '1', and at circle '2', the fleet reconfiguration service 116 determines that "option 1" (as described with regard to FIG. 1) is to be followed, meaning that two small slots 137G-137H will be eliminated and one new medium slot 139E will be created.

In this example embodiment, the fleet reconfiguration service 116 sends a first control message 130 reflected by circle '3A' to isolate the electronic device 134A, causing the CM 112 to at circle '3B' perform an update (via an update message 132) to set the device as being isolated (e.g., in the CM data store 124). In some embodiments, an "isolated" electronic device causes that electronic device to be removed from consideration (e.g., by the placement service 114) when selecting slots for compute instance placement/launches, though this state does not prevent operations involving existing compute instances executing at that device—e.g., customer-initiated workflows like the termination of an instance, an attach or detach of a volume of an instance, etc. Accordingly, by placing the electronic device in the isolation state, the existing "free" slots should remain free and the determinations of the fleet reconfiguration service 116 will not be compromised due to a change of state of these slots, while existing activity on the device can continue on unaffected.

Optionally, at circle '4', the fleet reconfiguration service 116 can verify 204 that the two selected slots 137G-137H to be reconfigured are truly "empty"—i.e., do not have an existing compute instance executing there. Although this check may not be strictly necessary in some systems, this check can be performed quickly as an additional safeguard that no existing user workloads will be negatively affected. In some embodiments, to perform the verification 204, the fleet reconfiguration service 116 may issue one or more commands (e.g., via one or more control messages 130) to the CM 112 to determine whether the two selected slots 137G-137H are empty. For example, the CM 112 may analyze a tracked state of each slot, and/or analyze a history of compute instance launches and/or terminations (e.g., from CM data store 124) to determine whether the selected slots 137G-137H have had a termination matching each launch.

At circle '5A', the fleet reconfiguration service 116 can send another control message 130 to deregister two slots (e.g., a "DeregisterSlot" message), which causes the CM 112 to perform an update at circle '5B' to remove the two slots. For example, removing the two slots can include removing "slot" and/or "slot info" data (as described later herein with regard to FIG. 3) for the two slots. In some embodiments, the removing of the two slots may further include adjusting (here, reducing) the number of total slots of the electronic device, adjusting a number of available slots corresponding to the two slots (here, reducing the "small" compute instance availability pool by two), etc.

At circle '6A', the fleet reconfiguration service 116 can send another control message 130 to add a new slot (e.g., a "RegisterSlot" message), which causes the CM 112 to perform an update at circle '6B' to add the slot. For example, adding the slot could adding "slot" and/or "slot info" data (as described later herein with regard to FIG. 3) for the new slot. In some embodiments, the addition of the slot may further include adjusting (here, adding) the number of total slots of the electronic device, adjusting a number of available slots corresponding to the slot (here, increasing the "medium" compute instance availability pool by one), etc.

In some embodiments, the "deregister" operations of circle '5A' and '5B' may be performed together with the "register" operations of circle '6A' and '6B' as part of a same transaction. For example, a single control message 130 can be sent indicating that the two slots are to be deregistered and that the one new slot is to be registered at circle '5A', resulting in one or more update messages 132 being sent to remove the two slots, add the new slot, and optionally update device slot information as part of a single transaction.

At circle '7A', the fleet reconfiguration service 116 can send another control message 130 to de-isolate the device, which causes the CM 112 to perform an update at circle '7B' to de-isolate the device by setting it back into "production." At this point, the electronic device can again be potentially selected for placement/launching of new compute instances by the placement service 114, and the "new" slot is exposed while the two now-removed slots are eliminated from consideration.

Figure 3:
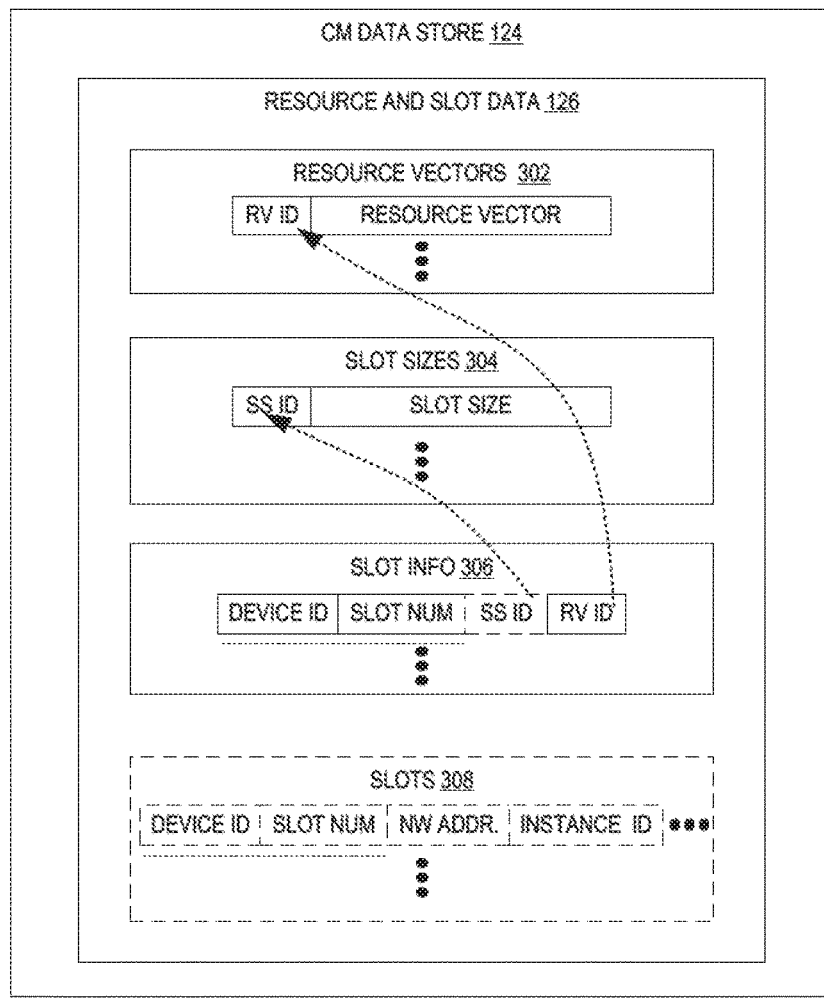
FIG. 3 is a diagram illustrating exemplary data that can be used as part of capacity management in a provider network using dynamic host device instance type reconfiguration according to some embodiments.

For an example of the resource and slot data 126 that can be utilized in some embodiments, we turn to FIG. 3, which is a diagram illustrating exemplary data that can be used as part of capacity management in a provider network using dynamic host device instance type reconfiguration according to some embodiments.

In some embodiments, the CM data store 124 comprises a database that can be accessed—directly or indirectly—via one or more control plane entities. The CM data store 124 can include resource and slot data 126 as described above, which can include one or more of a collection (or table) of resource vectors 302, a collection of slot sizes 304, a collection of "slot info" 306, and/or a collection of slots 308.

Each entry (or row, record, etc.) of the resource vectors 302 may include a resource vector (RV) identifier (ID) and a normalized, encoded resource vector as described herein. Likewise, each entry of the slot sizes 304 may include a slots size (SS) ID and a normalized slot size value that indicates a particular "size" or "type" of the slot.

In some embodiments, the resource and slot data 126 includes a "slot info" 306 collection, where each entry includes an electronic device identifier (that uniquely identifies a particular host electronic device within the provider network), and a slot number that is unique within the context of that electronic device. In some embodiments, each entry may also include a SS ID, which may optionally be used (e.g., via a foreign key relationship, via a simple reference, etc.) to identify a particular slot size. In some embodiments, each entry may also include an RV ID, which may be used to identify via the particular resource vector (of the resource vectors 302) that describes the characteristics of the slot.

In some embodiments, the resource and slot data 126 includes a "slots" 308 structure that keeps track of utilized slots, where each entry may include fields such as the host electronic device identifier, a slot number identifier, and one or more utilization values such as a network address utilized by a compute instance in the slot, an instance identifier of a compute instance in that slot, and/or any other number of values.

Thus, in various embodiments this resource and slot data 126 can be used to determine useful information for the operations described herein. For example, in some embodiments, the available slots in the provider network can be identified by selecting those of the slot info 306 entries that do not have a corresponding entry in the slots 308 structure. As another example, the current utilization of slots can be determined by querying the slots 308 structure. Of course, many other uses and types of resource and slot data 126 can be used in various embodiments.

Figure 4:
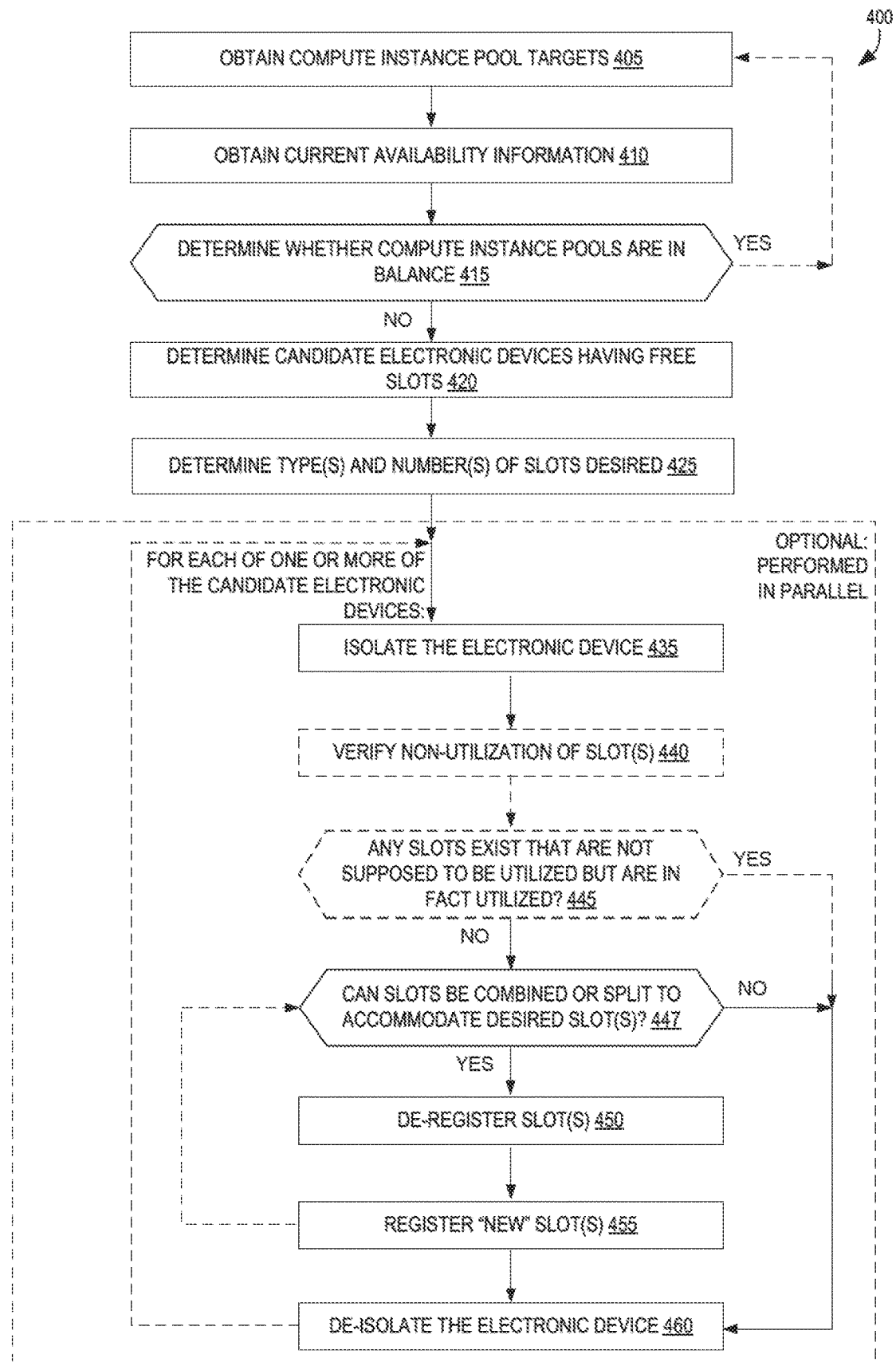
FIG. 4 is a flow diagram illustrating operations for capacity management in a provider network using dynamic host device instance type reconfiguration according to some embodiments.

Exemplary operations 400 for capacity management in a provider network using dynamic host device instance type reconfiguration according to some embodiments are shown in the flow diagram of FIG. 4. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by the control plane or fleet reconfiguration service of the other figures.

The operations 400 include, at block 405, obtaining compute instance pool targets. Block 405 may be performed by the fleet reconfiguration service, which obtains the compute instance pool targets as part of forecast data from a forecasting service. The obtaining may include sending a request message for the forecast data and receiving a response message including the forecast data, reading the forecast data from a message queue (where it was placed by the forecasting service), etc. In some embodiments, the forecast data was generated by the forecasting service based on historic compute instance utilization information, and may include the compute instance pool targets that indicate, for each of one or more "types" of compute instances, a total amount (or an additional amount) of compute instances of that type that are expected to be utilized at an upcoming point in time (or time range).

The operations 400 include, at block 410, obtaining current availability information (e.g., a current availability of slots for one or more compute instance types). Block 405 may be performed by the fleet reconfiguration service, and may include directly or indirectly (e.g., via a CM) obtaining current numbers of slots of one or more compute instance types that are available. This data may be obtained from resource and slot data stored by a CM data store.

At block 415, the operations 400 include determining whether the compute instance pools are in balance. Block 415 may be performed by the fleet reconfiguration service, and may include determining whether, for each compute instance type, the available number of slots (from the current availability information) is greater than or equal to a predicted number of slots of that type (according to the compute instance pool targets). In some embodiments, block 415 may include determining whether, for each compute instance type, the available number of slots includes at least a threshold amount more slots (e.g., one, two, five, ten, etc.) than the predicted number of slots of that type.

If all of the compute instance types are identified as being balanced, the flow may continue according to the YES branch and terminate or, at some point in time, begin the operations 400 again. If one or more of the compute instance types are identified as not being balanced, the flow may continue according to the NO branch to block 420.

At block 420, the operations 400 include determining a list of "candidate" electronic devices that have available slots that potentially may be able to be utilized to create desired slots. In some embodiments, block 420 is performed by the fleet reconfiguration service sending a request to the CM 112 (or directly to a CM data store 124) to return a list of electronic devices having available slots.

At block 425, the operations 400 include determining which types of slots are desired to be created (e.g., to "balance" the compute instance pools according to projected demand) and how many of each type of slot is desired to be added. Block 425 may be performed by the fleet reconfiguration service, and may be performed with or after block 410 by, as one example, identifying slot types having a desired number (of the slot type) from the pool targets that exceeds the current availability of the slots type, and determining the difference between these values as the desired number of slots for a slot type.

For each of one or more of the candidate electronic devices having one or more slots available to be reconfigured, a set of operations may be performed. These operations can be performed as illustrated by a single entity (e.g., a thread, process, or compute unit), though in some embodiments these operations can be performed in parallel using multiple entities. The operations are performed until each of the set of candidate electronic devices have been processed, or until all of the desired types and numbers of desired slots (e.g., from block 425) have been created.

With a selected one of the candidate electronic devices, at block 435, the electronic device is isolated. Block 435 may include sending a request message to isolate the electronic device to a recipient service (e.g., a CM), that causes a data store to be updated to reflect that the device is isolated and thus, is not eligible to have compute instances launched or designated to be launched thereupon (while it remains in the isolated status). Thus, in some embodiments the electronic device is removed from consideration as a potential placement location to launch compute instances for other requests. At this point, other existing compute instances of the electronic device may continue to operate without impact, and associated customers can continue to use these compute instances throughout this process.

Optionally, at block 440, the operations 400 include verifying the non-utilization of the slot(s) to be reconfigured. Block 440 may be performed by the fleet reconfiguration service, and may include querying a VM management server, hypervisor, etc., for information about the slot that would indicate if a compute instance is executing at the slot. In some embodiments, block 440 is partially performed by a CM, which may include performing a lookup in a data structure that tracks the state of each slot, or may include the CM sending a request to the electronic device that allows the CM to determine if the slot is utilized.

At block 445, the operations 400 optionally include determining whether any of the slots exist that are not supposed to be utilized but in fact are being utilized. Block 445 may be performed by the fleet reconfiguration service, and may be based on the verifying of block 440. For example, result data returned from the verifying may indicate whether any compute instances execute at the slot(s), and thus block 445 can include analyzing the result data to determine whether this is the case. If so, the flow may continue to block 460, where the electronic device is removed from isolation, and the flow may continue back to, e.g., analyze another electronic device and begin block 435, etc.

Otherwise, the operations 400 continue at block 447 with determining whether any of the slots of the electronic device that are available can be combined or split (or "reconfigured") to create a desired slot. For example, for a first compute instance type (e.g., "large"), block 447 could include identifying a group of second compute instance types at a particular electronic device (e.g., sixteen "extra-small" compute instance slots, or two "medium" compute instance slots) that could be collectively replaced (e.g., with the large slot). As another example, for a first compute instance type (e.g., "medium"), block 447 could include identifying a grouping of second compute instance types at a particular electronic device (e.g., two "small" compute instance slots) and/or a third instance type (e.g., a single "large" or a single "xlarge") that could be replaced to yield a slot for the first compute instance type.

In some embodiments, block 447 can take into account characteristics of the slots when determining if and how the slots can be reconfigured. For example, in some embodiments, NUMA boundaries can be accounted for, e.g., slots at different NUMA nodes, in some scenarios, might not be combined to form a "larger" slot. Thus, some embodiments may not attempt to "create" a potential slot that spans across NUMA nodes, which could lead to decreased performance for a compute instance that would be placed at such a slot. In some embodiments, other computer architecture features can similarly be taken into account when determining how slots can be reconfigured. For example, a particular storage or memory (e.g., an L2 cache and/or L3 cache, or section thereof, memory bank, etc.) may be associated with a particular slot, and thus in some scenarios two slots that are associated with different memory locations (e.g., caches) may potentially not be combined to yield a different type of slot. Thus, some embodiments can utilize a reconfiguration process that creates slots having optimal architecture to support particular types of compute instances. In some embodiments, the determination at block 447 includes first ensuring that NUMA boundaries are honored as described above, and then attempting to find slots having processors that share cache lines.

When one or more existing slots are identified to be replaced with one or more desired slots, the flow of operations continues with block 450 and de-registering the existing slot(s). Block 450 can be performed by the fleet reconfiguration service, and may include sending a control message to de-register the slot(s) that includes identifiers of these one or more slots, which may result in one or more slot (and/or or "slot info") entries being removed (or modified) in resource and slot data of a CM data store. At block 455, the operations 400 include registering the new desired slot(s). Block 455 can be performed by the fleet reconfiguration service, and may include sending a control message to register one or more slot(s), which may include a resource vector for each slot, which may result in one or more slot (and/or or "slot info" and/or resource vector) entries being inserted in resource and slot data of a CM data store. In some embodiments, blocks 450 and 455 may be performed as a single "transaction" operation, and thus either both of these blocks will be performed or neither will be performed (in the event of some failure).

At this point, the flow may optionally continue back to block 447 for further analysis to determine if other available slots of the electronic device can be reconfigured to satisfy a remaining desired slot type. This configuration may be used under a greedy algorithmic approach in which the reconfiguration occurs immediately upon a detection of a set of slots that can be reconfigured for a particular desired slot. However, in other embodiments, a more complete analysis can be performed as part of block 447 to identify all possible existing slots that can be reconfigured to satisfy one—or multiple—desired slots, and thus blocks 450 and 455 can be performed for multiple slots.

Upon completing the process for a particular electronic device, at block 460, the operations 400 include de-isolating the electronic device. Block 460 can be performed by the fleet reconfiguration service, and may include sending a request message to de-isolate the electronic device to a recipient service (e.g., a CM), which causes a data store to be updated to reflect that the device is no longer isolated (e.g., is returned to a "production" status) and thus, is again eligible to be selected to have compute instances launched thereupon. The flow may then continue back, and if additional slots are desired to be created and additional candidate electronic devices exist, another candidate electronic device can be selected and blocks 435-460 can be performed again.

Figure 5:
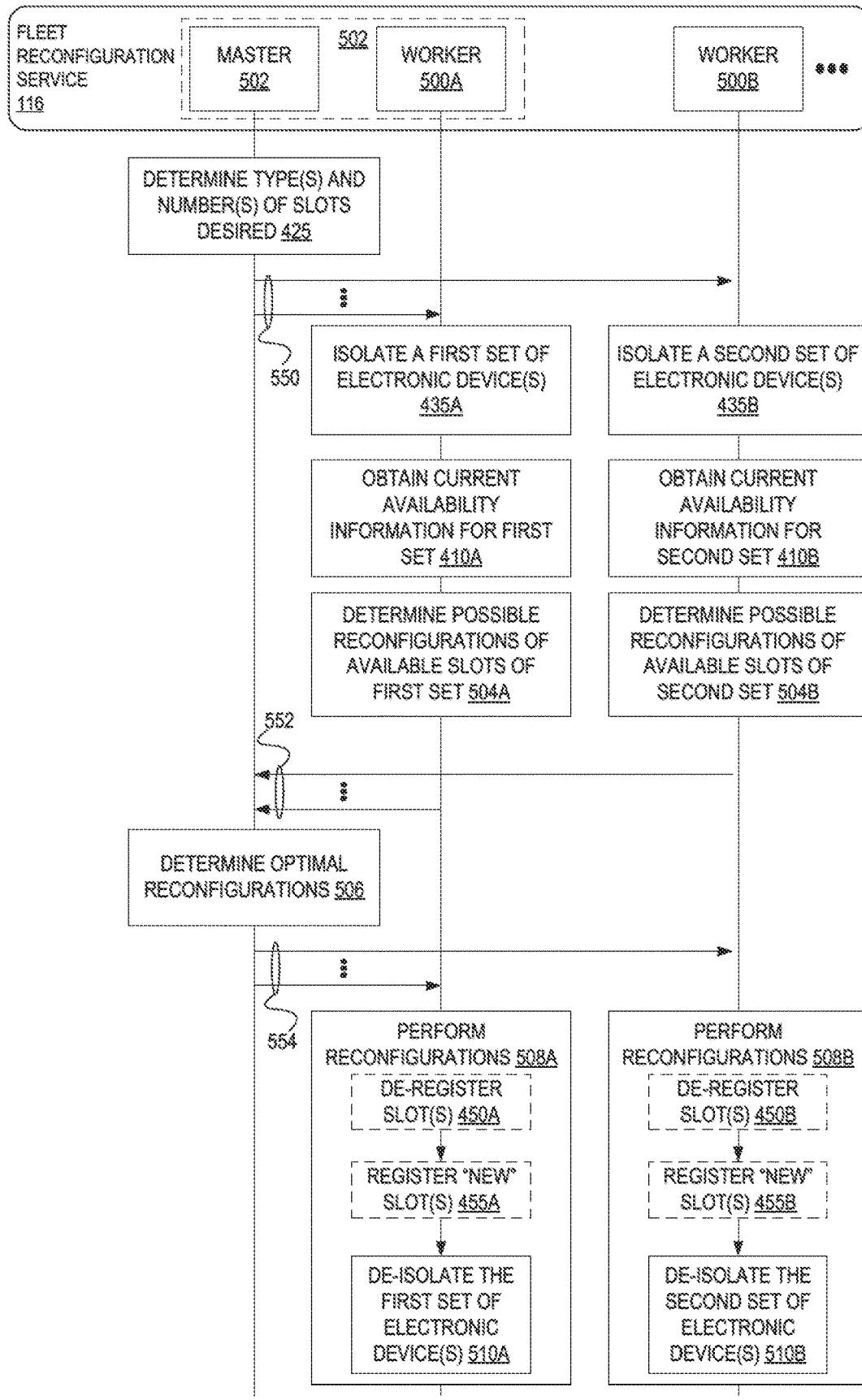
FIG. 5 is a combined flow and sequence diagram illustrating operations involving multiple workers for capacity management in a provider network using dynamic host device instance type reconfiguration according to some embodiments.

These operations 400 of FIG. 4, of course, can be performed in different ways in different environments, and may include more, fewer, and/or different operations. For example, FIG. 5 is a combined flow and sequence diagram illustrating multiple workers 500A-500B working at least in part in parallel to perform efficient capacity management in a provider network via dynamic host device instance type reconfiguration according to some embodiments. Some of these operations are at least conceptually (if not technically) similar to the operations of FIG. 4 as indicated via the use of similar reference numbers; however, such operations may be performed at different times, by different entities, etc.

In this example, the fleet reconfiguration service 116 utilizes multiple entities—here, a master 502 and two workers 500A-500B. Each of these entities can be a separate application, thread, process, function, compute instance, etc., and some or all entities may be executed by a common or different electronic device at a same or different location, data center, etc. In this case, two workers 500A-500B are shown as being utilized; however, more or fewer workers can be used in different embodiments. Similarly, in this embodiment a master 502 entity is shown as being utilized that is separate from the workers 500A-500B; however, in some embodiments, one of the workers (e.g., worker 500A) may also act as the master 502.

As shown in FIG. 5, a master 502 (e.g., a control server/application) of the fleet reconfiguration service 116 can determine, at block 425, which type or types of slots are desired, and the numbers of slots of each type that are desired. For example, the master 502 may obtain compute instance pool target information and/or current availability information and compare the two to identify a difference, as described herein. The master 502 sends a set of messages 550 (or instructions/commands) to one or more workers—here, worker 500A and 500B—though more or fewer workers may be utilized, and in some embodiments, the master 502 itself may act as one of the workers 500A.

Upon receipt of the messages 550, the first worker 500A and second worker 500B may each begin a set of operations to identify what possible slot types and the numbers thereof that a set of associated electronic devices (or "hosts") can potentially provide via reconfiguration. These operations may be performed in whole or in part in parallel across the workers. For example, each worker may be associated with (or "govern") a defined set of electronic devices, such as those devices of one or more defined racks, of one or more data centers, of one or more types, etc. Each worker can thus isolate the associated set of electronic devices at blocks 435A-435B, which can include sending a request message to isolate the electronic device(s) to cause a data store or data structure to be updated to reflect that the device(s) are isolated and thus, are not eligible to have new compute instances launched or designated to be launched thereupon, as described herein.

Having isolated one or more electronic devices, each worker can obtain current availability information (e.g., numbers and types of available slots) for these associated sets of devices at blocks 410A-410B, and at blocks 504A-504B determine possible reconfigurations of the available slots of the associated set of electronic devices. For example, the workers can determine which of the available slots can be consolidated with others of the slots to form a "larger" slot for a "larger" slot type and/or which of the available slots can be broken up to form "smaller" slots for "smaller" slot types. For example, upon identifying four free "medium" slots, a worker may determine that the four free "medium" slots could be consolidated into one "extra-large" slot, or 2 "large" slots, or 1 "large" slot and eight "small" slots, and so on. Notably, in some embodiments this exhaustive determination can identify all possible reconfigurations that are possible with the available slots in an extremely short amount of time. In some embodiments, the determination can take into account the particular characteristics of the slot types and the compute architecture underlying the slots as described above, for example, to ensure that a newly-created slot does not span across a NUMA boundary, and/or that a newly-created slot utilizes the same or nearby computer architectural supports (e.g., memory), etc.

The workers can then send the potential reconfiguration data via messages 552 to the master 502, which can thus determine which slot or slots should be configured across all of the electronic devices governed by all of the workers to meet the desired amount of slot types and numbers thereof. The master can make this determination using any of a variety of types of information in addition to the received potential reconfiguration data. For example, a master 502 may seek to distribute certain types of slots across various locations (e.g., racks, networks, data centers, geographic regions), consolidate certain types of slots in various locations (e.g., due to a predicated need for certain slots at certain locations), etc.

Thus, the master 502 can send reconfiguration assignment messages 554 to the workers 500A-500B instructing the workers as to how to perform the reconfigurations. For example, a reconfiguration assignment message 554 sent to the first worker 500A may indicate that the worker 500A is to reconfigure slots on two different electronic host devices, and the worker 500A may, for each device, de-register any needed slots and replace those slots accordingly by registering new slots (at blocks 450A/455A, which again may be part of one operation or two operations) and then de-isolate the associated "first" set of electronic devices at block 510A. Likewise, the other workers—such as worker 500B—may perform similar operations with its own "second" set of associated electronic devices, which may be performed in whole or in part in parallel with the reconfigurations of the other workers.

Figure 6:
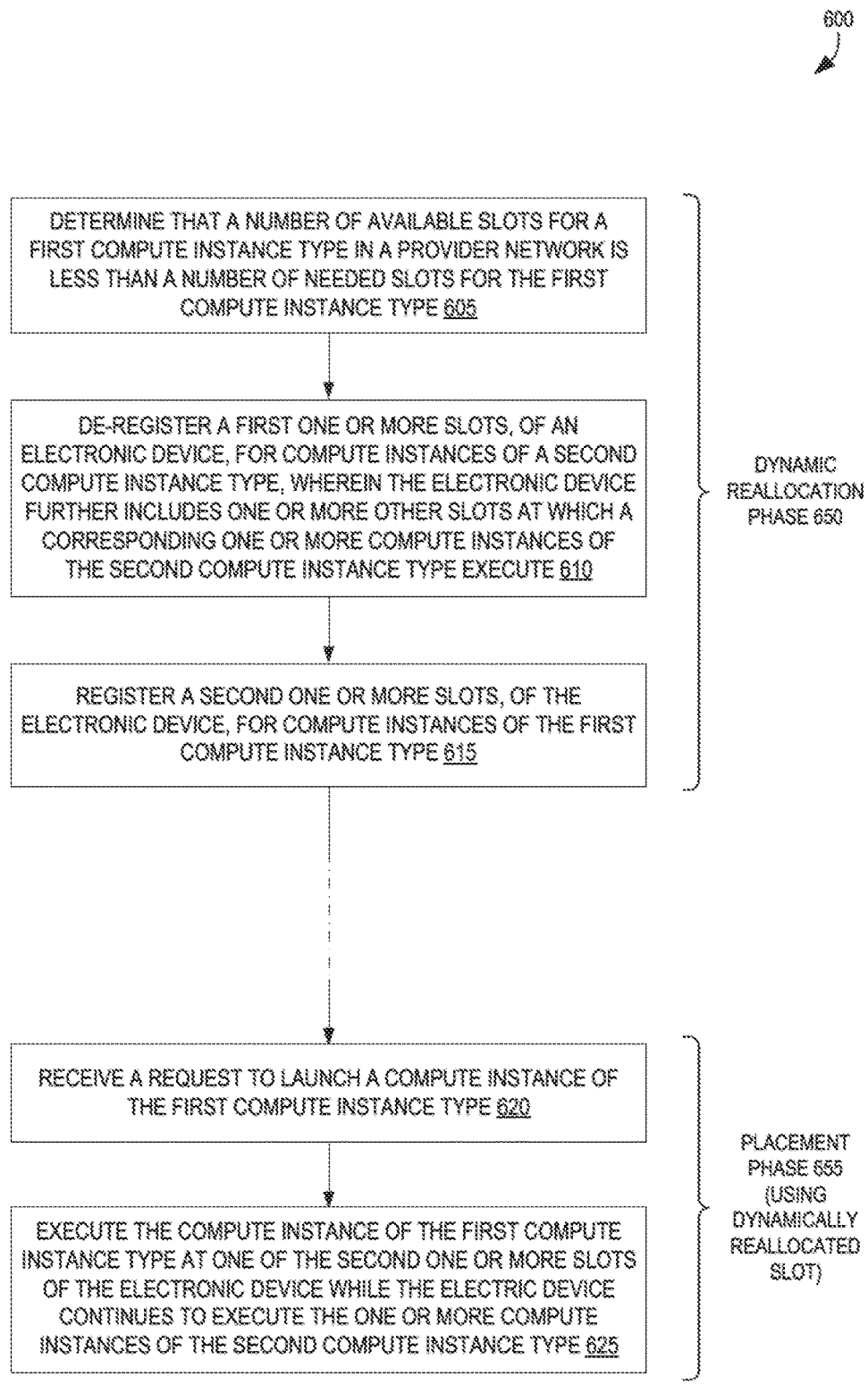
FIG. 6 is a flow diagram illustrating operations for capacity management in a provider network using dynamic host device instance type reconfiguration according to some embodiments.

Yet another set of operations is shown in FIG. 6, which is a flow diagram illustrating operations 600 for capacity management in a provider network using dynamic host device instance type reconfiguration according to some embodiments. In some embodiments, one or more (or all) of the operations 600 are performed by the control plane of the other figures.

Specifically, blocks 605/610/615 may be performed by the fleet reconfiguration service of the other figures, and may be performed as part of a dynamic reallocation phase 650 of operations. The dynamic reallocation phase 650 of operations may occur in an "offline" manner and thus, not directly in response to any particular request to launch a compute instance.

The operations 600 include, at block 605, determining that a number of available slots for a first compute instance type in a provider network is less than a number of needed slots for the first compute instance type. Each slot may be a combination of computing resources that can be provided by a host electronic device.

The operations 600 include, at block 610, de-registering a first one or more slots, of an electronic device, for compute instances of a second compute instance type. The electronic device further includes one or more other slots at which a corresponding one or more compute instances of the second compute instance type execute. In some embodiments, de-registering the first one or more slots includes sending a deregister slot request message that includes an identifier of the electronic device and an identifier of one of the first one or more slots.

The operations 600 include, at block 615, registering a second one or more slots, of the electronic device, for compute instances of the first compute instance type. In some embodiments, the first one or more slots comprises a plurality of slots, and the second one or more slots comprises a single slot; however, in other embodiments, the first one or more slots comprises a single slot, and the second one or more slots comprises a plurality of slots. In some embodiments, registering the second one or more slots includes sending a register slot request message that includes an identifier of the electronic device and a resource vector describing one or more characteristics of one of the one or more slots. In some embodiments, registering the second one or more slots of the electronic device for compute instances of the first compute instance type comprises inserting a record in a slot information data structure for a first of the second one or more slots, the record including an identifier of the electronic device, an identifier of a slot number that is unique within the context of the electronic device, and an identifier of a resource vector, where the resource vector describes one or more characteristics of the first slot.

In some embodiments, blocks 610 and 615 are combined into a single transactional operation that is performed atomically.

In some embodiments, the operations 600 further include, prior to de-registering the first one or more slots at block 610, placing the electronic device into isolation. While in isolation, the electronic device continues to execute the one or more compute instances of the second compute instances type but is not available to have additional compute instances placed thereupon. Additionally, after registering the second one or more slots at block 615, the operations 600 further include removing the electronic device from isolation.

In some embodiments, after placing the electronic device into isolation, the operations 600 further include verifying that the first one or more slots are not executing any compute instances. In some embodiments, after placing the electronic device into isolation and before removing the electronic device from isolation, the operations 600 further include receiving a request to perform an action involving at least one of the one or more compute instances of the second compute instance type that execute on the electronic device, and performing the action. The action can include, for example, terminating at least one of the one or more compute instances, attaching or detaching a volume to/from at least one of the one or more compute instances, etc.

The operations 600 may also include a second placement phase 655, including blocks 620/625, that may utilize the "new" second one or more slots registered in block 615. This second placement phase 655 may be "inline" and thus involve a request to launch a compute instance.

The operations 600 include, at block 620, receiving a request to launch a compute instance of the first compute instance type. Block 620 may be performed, for example, by an interface of a provider network, by a control plane of a provider network, by a CM of a provider network, etc.

In some embodiments, the operations 600 further include sending a request to a placement service to select a slot for the compute instance of the first compute instance type; receiving a response from the placement service including a resource vector corresponding to the one of the second one or more slots of the electronic device that describes one or more characteristics of the one of the second one or more slots; and identifying the one of the second one or more slots of the electronic device as a placement location for the compute instance of the first compute instance type based on the resource vector.

The operations 600 also include, at block 625, executing the compute instance of the first compute instance type at one of the second one or more slots of the electronic device while the electric device continues to execute the one or more compute instances of the second compute instance type. Block 620 may be performed, for example, by a control plane of a provider network, by a instance management service of a provider network, etc., via transmitting messages/commands to cause the compute instance to be executed.

Figure 7:
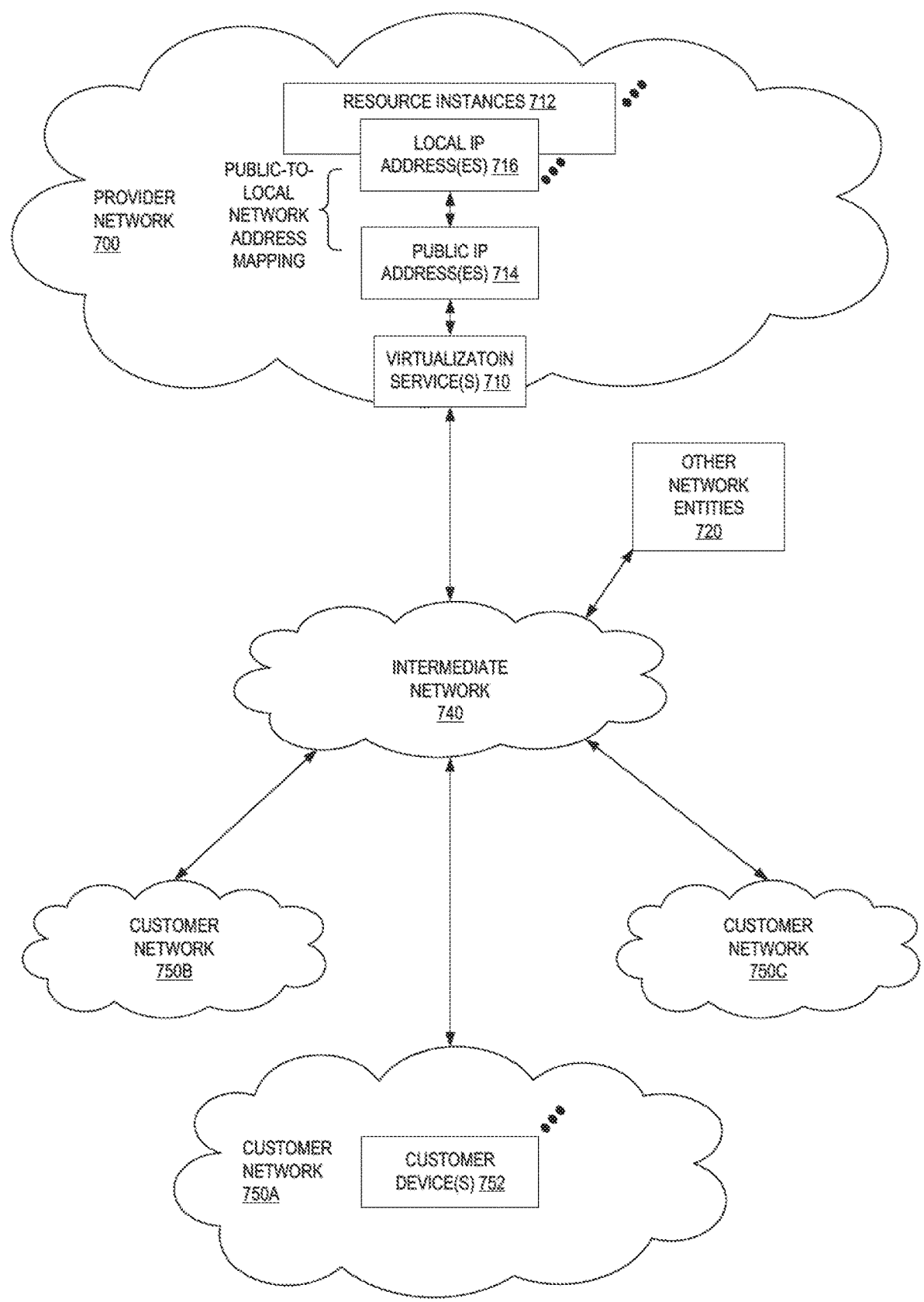
FIG. 7 illustrates an example provider network environment according to some embodiments.

For further detail, FIG. 7 illustrates an example provider network environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local internet protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates client network 750A) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network 750A may, for example, implement customer-specific applications and present the customer's applications on an intermediate network 740, such as the Internet. Other network entities 720 on the intermediate network 740 may then generate traffic to a destination public IP address 714 published by the customer network 750A; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal network addresses of resource instances in a provider network. Local IP addresses are only mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
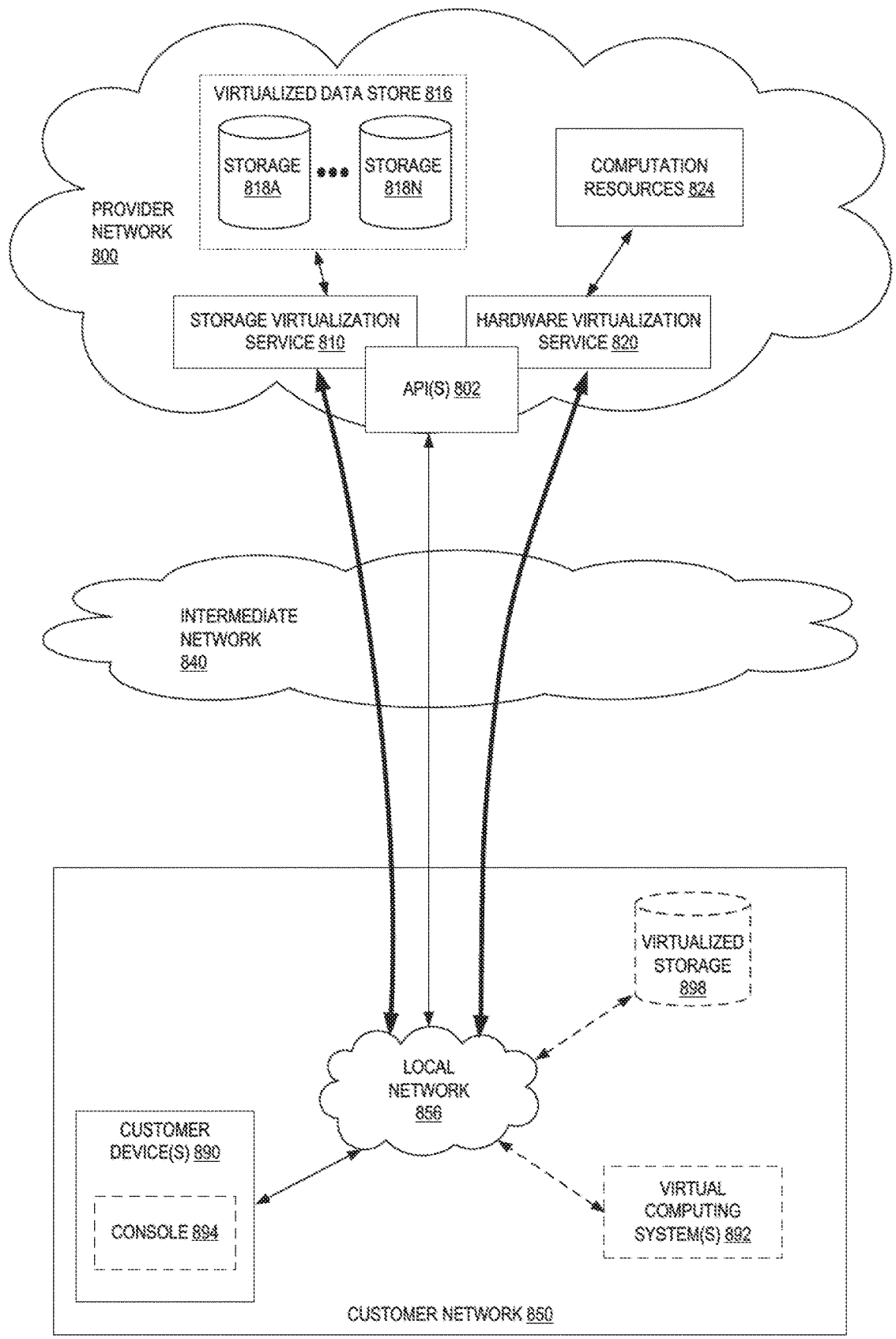
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage virtualization service 810, for example via one or more APIs 802, to access data from and store data to a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
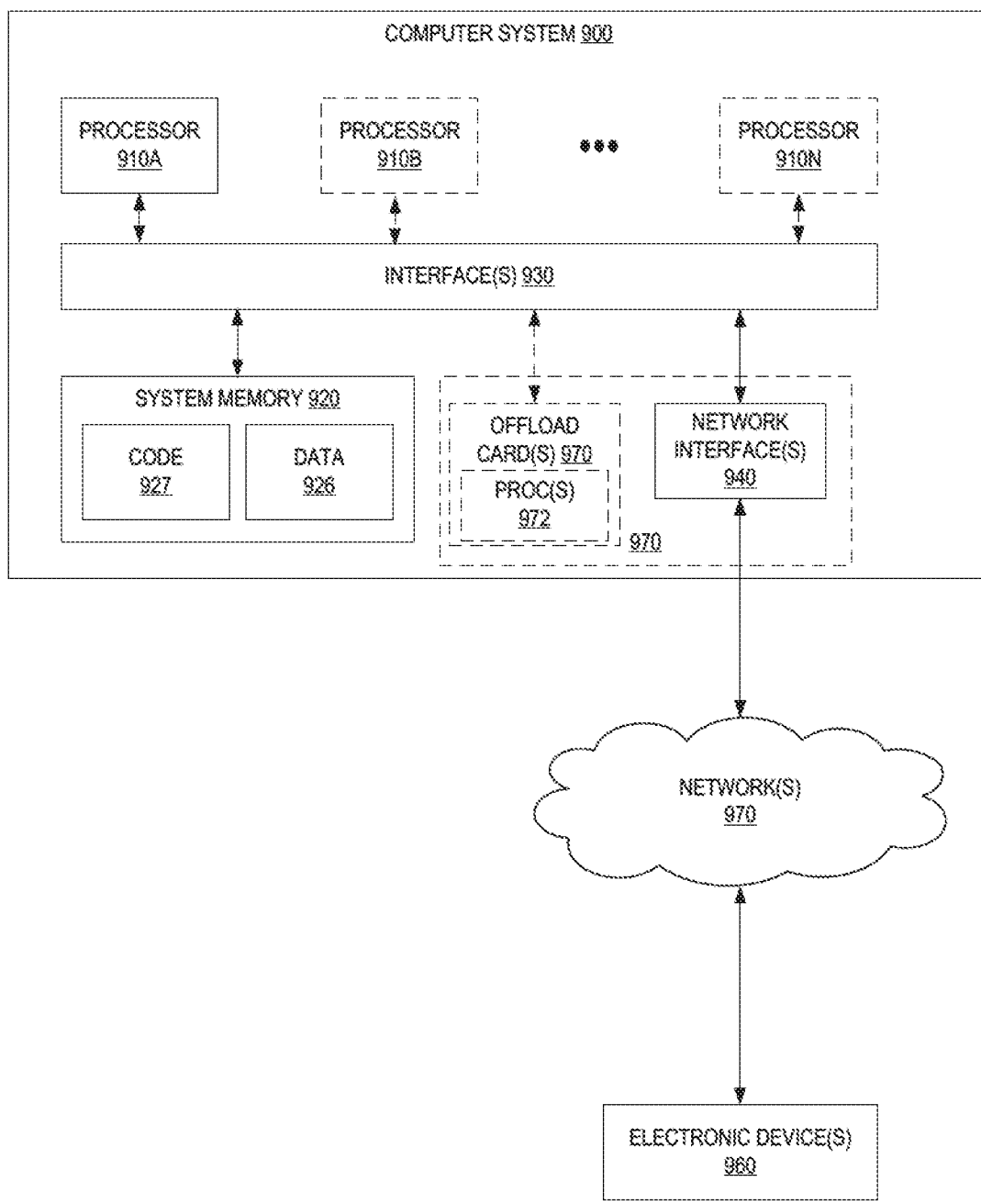
FIG. 9 is a block diagram illustrating an example computer system that may be used in some embodiments.

In some embodiments, a system that implements a portion or all of the techniques for capacity management in a provider network using dynamic host device instance type reconfiguration as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

As one example, in some embodiments a computer system 900 could be a host electronic device that hosts compute instances, and may include one or more offload cards 970 (including one or more processors 975, and possibly including the one or more network interfaces 940) as described herein that are connected using an I/O interface 930. In some embodiments, the one or more offload cards 970 can execute a virtualization manager that can manage, for example, virtual machine compute instances that execute on the host electronic device, independent of a hypervisor or in combination with a hypervisor that executes using the traditional processors 910A-910N of the computer system 900.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 920 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 134A-134C, 136A-136B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    determining to increase a number of available slots for a first compute instance type in a provider network, wherein the provider network includes a plurality of computing devices configured with slots to host compute instances of a plurality of different compute instance types, wherein each of the different compute instance types has a different combination of processing, memory, and networking resource availability; and
    causing creation of a first slot of the first compute instance type by converting a second slot of a second compute instance type into the first slot of the first compute instance type, wherein the converting includes:
        placing a computing device, of the plurality of computing devices, that hosts the second slot into isolation, wherein while in isolation the computing device continues to execute any existing compute instances on other slots of the computing device but is not available to have additional compute instances placed thereupon;
        after the placing of the computing device into isolation, creating the first slot on the computing device, de-registering the second slot in a slot information data structure, and registering the first slot in the slot information data structure; and
        removing the computing device from isolation.

2. The computer-implemented method of claim 1, wherein creating the first slot comprises:
    combining the second slot of the second compute instance type and at least one other slot of the second compute instance type into a single slot of the first compute instance type; or
    splitting the second slot of the second compute instance type into the first slot of the first compute instance type and at least one other slot of the first compute instance type.

3. The computer-implemented method of claim 1, wherein the first compute instance type and the second compute instance type are both of a same instance family, and wherein the first compute instance type and the second compute instance type are of different sizes within the instance family.

4. The computer-implemented method of claim 1, wherein registering the first slot includes:
    inserting or updating one or more records in the slot information data structure for the first slot, the one or more records including an identifier of a computing device associated with the first slot and an identifier of a slot number.

5. The computer-implemented method of claim 4, wherein the one or more records further include an identifier of a non-uniform memory access (NUMA) node associated with the first slot.

6. The computer-implemented method of claim 1, further comprising:
    after the placing of the computing device into isolation, verifying that the second slot is not executing any compute instance.

7. The computer-implemented method of claim 1, wherein determining to increase the number of available slots for the first compute instance type is based on obtaining forecasting data identifying a predicted number of compute instances of the first compute instance type that will be needed within the provider network at a future time.

8. The computer-implemented method of claim 1, further comprising:
  receiving a request to launch a compute instance of the first compute instance type; and
  launching the compute instance of the first compute instance type using the first slot of the first compute instance type.

9. The method of claim 1, further comprising updating an availability of a first capacity pool for slots of the first compute instance type and updating an availability of a second capacity pool for slots of the second compute instance type.

10. One or more non-transitory computer-readable storage media having instructions which, when executed by one or more processors of one or more computing devices, cause the one or more computing devices to perform operations comprising:
  determining to increase a number of available slots for a first compute instance type belonging to a first instance family available in a provider network, wherein the provider network includes a plurality of computing devices configured with slots to host compute instances of at least the first instance family, wherein the first instance family includes the first compute instance type and a second compute instance type that have a common ratio of processing, memory, and networking resource availability but different sizes of the processing, memory, and networking resource availability;
  determining to increase the number of available slots for the first compute instance type by converting capacity from slots of the second compute instance type in the first instance family; and
  creating a first slot for the first compute instance type by converting a second slot of a second compute instance type into the first slot of the first compute instance type, wherein converting the second slot into the first slot includes:
    placing a computing device, of the plurality of computing devices into isolation, wherein the computing device hosts the second slot, and wherein while in isolation the computing device continues to execute any existing compute instances on other slots of the computing device but is not available to have additional compute instances placed thereupon;
    after the placing of the computing device into isolation, creating the first slot, deregistering the second slot in a slot information data structure, and registering the first slot in the slot information data structure; and
    removing the computing device from isolation.

11. The one or more non-transitory computer-readable storage media of claim 10, wherein creating the first slot includes:
  combining the second slot of the second compute instance type and at least one other slot of the second compute instance type into a single slot of the first compute instance type; or
  splitting the second slot into the first slot and at least one other slot of the first compute instance type.

12. The one or more non-transitory computer-readable storage media of claim 10, wherein registering the first slot includes:
  inserting or updating one or more records in the slot information data structure for the first slot, the one or more records including an identifier of a computing device associated with the first slot and an identifier of a slot number.

13. The one or more non-transitory computer-readable storage media of claim 12, wherein the one or more records further includes an identifier of a non-uniform memory access (NUMA) node associated with the first slot.

14. The one or more non-transitory computer-readable storage media of claim 10, further comprising:
  after the placing of the computing device into isolation, verifying that the second slot is not executing any compute instances.

15. The one or more non-transitory computer-readable storage media of claim 10, wherein determining to increase the number of available slots for the first compute instance type comprises:
  determining, based on forecasting data, that a first pool of capacity for compute instances of the first compute instance type is predicted to be insufficient to meet a future need; and
  identifying, based on the forecasting data, a second pool of capacity for compute instances of the second compute instance type is predicted to have excess capacity.

16. The one or more non-transitory computer-readable storage media of claim 10, further comprising instructions which, when executed by the one or more processors of the one or more computing devices, cause the one or more computing devices to perform operations comprising updating an availability of a first capacity pool for slots of the first compute instance type and updating an availability of a second capacity pool for slots of the second compute instance type.

17. A system comprising:
  a hardware virtualization service of a provider network comprising a plurality of computing devices configured with slots to execute compute instances for users of the provider network of a plurality of different compute instance types belonging to a plurality of different capacity pools, wherein each of the different compute instance types has a different combination of processing, memory, and networking resource availability; and
  a control plane of the provider network implemented by one or more computing devices, the control plane comprising instructions that upon execution cause the control plane to balance the plurality of capacity pools by performing operations comprising:
    determining that an availability of a first capacity pool, of the plurality of capacity pools, for compute instances of a first compute instance type is insufficient to meet a projected demand for compute instances of the first compute instance type;
    determining that an availability of a second capacity pool, of the plurality of capacity pools, for compute instances of a second compute instance type is more than sufficient to meet a projected demand for compute instances of the second compute instance type; and
    creating a first one or more slots for the first compute instance type by converting a second slot of a second compute instance type into the first one or more slots of the first compute instance type, wherein the first one or more slots and the second slot are associated with a single computing device of the plurality of computing devices of the hardware virtualization service, and wherein the control plane, to convert the second slot into the first one or more slots is to at least:

place the computing device into isolation, wherein while in isolation the computing device continues to execute any existing compute instances running on other slots of the computing device but is not available to have additional compute instances placed thereupon;

after the computing device is placed into isolation, create the first one or more slots, de-register the second slot in a slot information data structure, and register the first one or more slots in the slot information data structure; and remove the computing device from isolation.

18. The system of claim 17, wherein the control plane, to convert the second slot into the first one or more slots, is to at least:

insert or update one or more records in a slot information data structure for a first slot of the first one or more slots, the one or more records including an identifier of a computing device associated with the first slot and an identifier of a slot number.

19. The system of claim 18, wherein the one or more records further include an identifier of a non-uniform memory access (NUMA) node associated with the first slot.

20. The system of claim 17, wherein the control plane further comprises instructions that upon execution cause the control plane to update the availability of the first capacity pool and the availability of the second capacity pool.

* * * * *